Aug. 14, 1962  J. K. BRADLEY ET AL  3,049,417
PROCESS FOR THE PRODUCTION OF FERTILIZER MATERIALS
Filed March 24, 1959
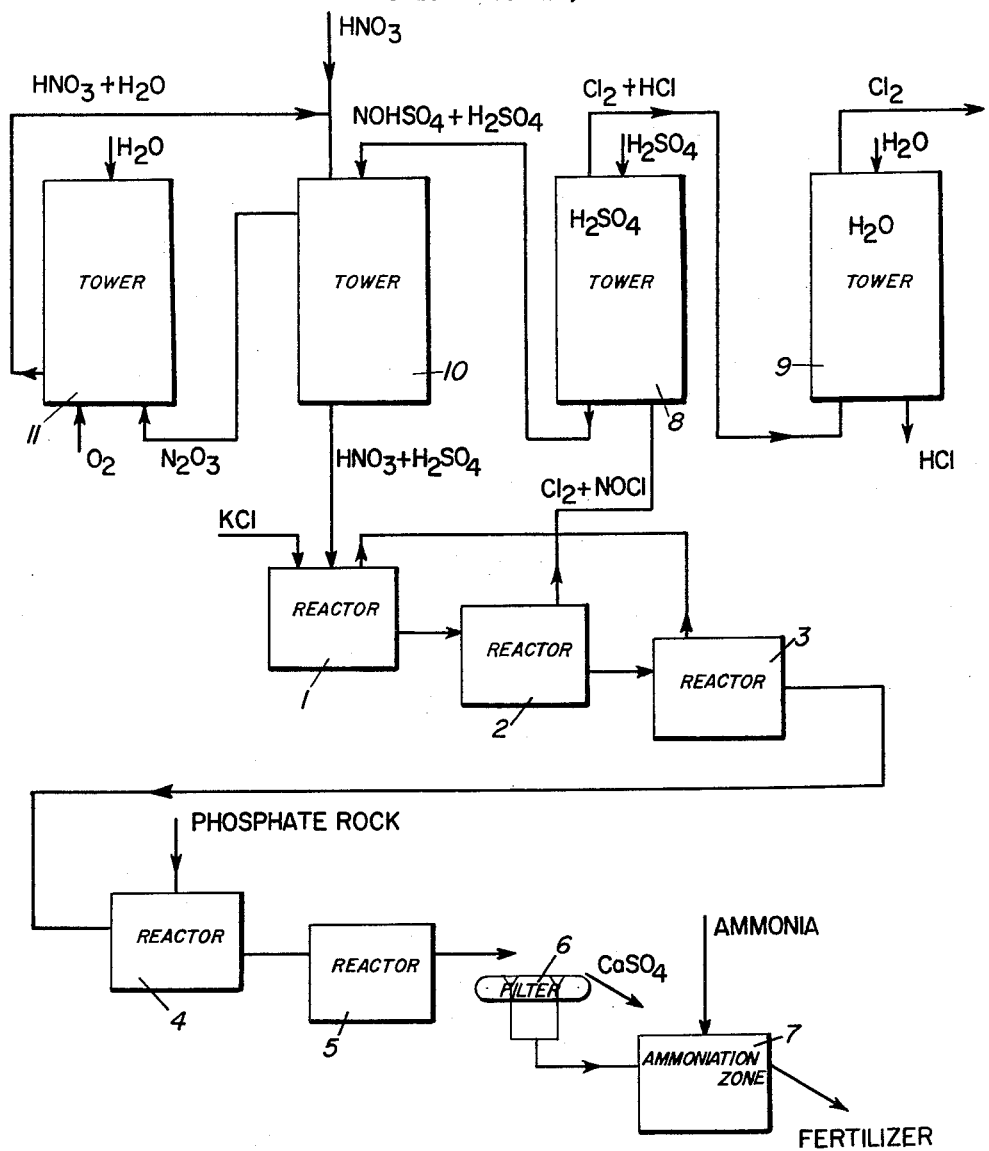
Inventors
*John Kenneth Bradley,*
*Geoffrey George Brown,*
*William Francis Sheldrick*
BY
*Wenderoth, Lind & Ponack*
Attorneys

3,049,417
PROCESS FOR THE PRODUCTION OF FERTILIZER MATERIALS

John K. Bradley, Ipswich, Geoffrey G. Brown, Woodbridge, and William F. Sheldrick, Felixstowe, England, assignors to Fisons Limited, Felixstowe, England, a British company
Filed Mar. 24, 1959, Ser. No. 801,602
Claims priority, application Great Britain Apr. 1, 1958
4 Claims. (Cl. 71—37)

The present invention relates to an improved process for the production of fertilizer materials.

Compound fertilizers contain two or more of the elements nitrogen, phosphorous and potassium, which are required for plant life, and are produced in liquid or powder form, and more usually in granular form. Such compound fertilizers comprise for example superphosphates, ammonium sulphate and potassium chloride, and are commonly prepared by mixing together materials containing the desired elements.

We have disclosed in our Patent 2,954,286 issued September 27, 1960 a process of preparing complex fertilizers by the reaction together of potassium chloride an nitric acid of a concentration in the range of 50–95% by weight to produce a liquid product at a temperature of order of 100° C. containing free nitric acid, removing the formed gaseous chlorine and nitrosyl chloride, and treating the product with phosphoric acid in the range of 50–70% by weight, if desired before or after the addition of a neutralizing agent such as ammonia. The nitric acid is added in amounts comprising 10 to 200% excess over the amount thereof stoichiometrically for reaction with potassium chloride (4 moles $HNO_3$ per 3 moles KCl).

We have now found that complex fertilizers may more conveniently be prepared by the reaction together of potassium chloride with nitric acid and sulphuric acid to produce a liquid product containing free acid, removing the formed gaseous chlorine and nitrosyl chloride, and treating the resulting product with phosphoric acid or phosphate rock. The complex fertilizer thus obtained may be more highly concentrated than can be otherwise obtained.

Accordingly the present invention is for a process for the production of a complex fertilizer which comprises reacting potassium chloride with nitric acid and sulphuric acid to produce a liquid product containing free acid, removing the formed nitrosyl chloride and chlorine, and treating the liquid product with phosphoric acid and/or phosphate rock.

It is preferred to carry out the process using the acids in considerable excess of the theoretical requirement for the reaction with potassium chloride since, inter alia, this permits the substantially complete reaction of the potassium chloride, with the result that a substantially or completely chloride-free fertilizer may be obtained, and the chlorine may be recovered fully. The acids are suitably employed in amount at least 10%, and preferably 20–200% excess over this requirement.

According to one embodiment of the invention the resulting product is thereafter treated with a neutralising agent, preferably ammonia.

The potassium chloride employed may comprise any of the usually available salts and may be of high or low purity. This material may be used in the solid form, preferably finely divided, or as a solution as is desired. The nitric acid employed should be of a concentration in the range of 40–95% and this nitric acid is conveniently of a concentration of about 60%.

The sulphuric acid which may be employed in the process of the present invention is suitably concentrated and preferably of a concentration in the range 70%–98% by weight.

The ratio of nitric acid to sulphuric acid may vary over a wide range, for example in the range 1:10 to 10:1 and preferably lies in the range 1:3 to 3:1. The total acids present are preferably in amount corresponding to 1.3 moles to 2.5 moles of acid per mole of potassium chloride.

The concentration of the nitric acid and sulphuric acid is necessarily interrelated, and desirably the water content of the mixed acids is of the order of 20%–40%, and preferably about 30%.

The phosphate rock employed in the present invention may be any of the phosphate rocks commonly employed such for example as the calcium phosphate type rock, which may be obtained for example from Morocco, Rhodesia, Florida, Palabora, Kola, and various Pacific Islands, or the alumino phosphate type rock which may be obtained for example from Senegal. It is preferred to use a phosphate rock of the calcium phosphate type. The phosphoric acid employed is suitably a concentrated acid for example of a concentration in the range 50%–70% (as $H_3PO_4$) by weight.

The neutralising agent is preferably ammonia, inter alia, as this is the cheapest source of nitrogen, but may also comprise other materials such as potassium hydroxide, potassium carbonate and the like. Where ammonia is employed as the neutralising agent, this may comprise aqueous ammonia, for example of 25%–33% concentration, or anhydrous ammonia.

The reaction between the nitric acid and sulphuric acid and potassium chloride is preferably effected at an elevated temperature, suitably in excess of 80° C. and may be carried out at normal, reduced or super-atmospheric pressure. It has been found most desirable to carry out the process at or about the boiling point of the reaction mixture, and when operating at normal pressures the use of temperatures in the range 100–120° C. is preferred.

At such temperatures the reaction between potassium chloride and nitric acid is rapid and proceeds according to the following equations:

$$3KCl + 4HNO_3 \rightarrow 3KNO_3 + NOCl + Cl_2 + 2H_2O$$

$$3KCl + 3H_2SO_4 + HNO_3 \rightarrow 3KHSO_4 + NOCl + Cl_2 + 2H_2O$$

and intermediately according to the proportions of the nitric acid and sulphuric acid.

The formed nitrosyl chloride and chlorine are evolved from the liquid product, and may be collected in any appropriate way.

The liquid product obtained in accordance with the present invention is treated with particulate phosphate rock and/or phosphoric acid.

The amount of phosphoric acid and/or phosphate rock which is employed in the process of the present invention is dependent ultimately on the N:P:K ratios and concentrations of the fertilizer product which it is desired to produce. It is preferred to employ the phosphoric acid and/or phosphate rock in amounts such that the total phosphorus added, expressed as phosphoric acid ($H_3PO_4$), comprises at least 15% by weight, and preferably 30%–200% by weight of the weight of the potassium chloride utilised in the process.

Where the liquid product is treated with phosphoric acid alone the sulphate content thereof is retained in the final product. On the other hand where the liquid product is reacted with phosphate rock at least part of the sulphate is precipitated as calcium sulphate. This reaction may be represented as follows:

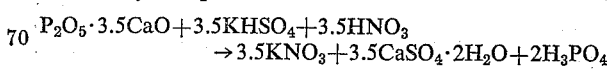
$$P_2O_5 \cdot 3.5CaO + 3.5KHSO_4 + 3.5HNO_3$$
$$\rightarrow 3.5KNO_3 + 3.5CaSO_4 \cdot 2H_2O + 2H_3PO_4$$

According to a preferred feature of this embodiment of the invention this calcium sulphate is filtered off, and the filtrate containing potassium nitrate and phosphoric acid utilised to obtain a completely water-soluble fertilizer, for example, by neutralising with ammonia or potassium hydroxide or carbonate.

The amount of neutralising agent which is employed is dependent on the nature of the desired final product. If it is desired to obtain liquid fertilizers, where this is appropriate, the amount of neutralising agent may vary over a wide range, and the neutralising agent may be added in either aqueous or anyhydrous form, while on the other hand, if it is desired to obtain a solid fertilizer, the amount of neutralising agent incorporated requires to be sufficient for neutralisation of the acid present, and is preferably added in anhydrous form, so as to reduce the volume of water required to be removed from the product. Vigorous agitation is most desirable during neutralisation. The heat of neutralisation is considerable, and according to a preferred feature of the invention, this is used to assist in dehydrating the mixture.

If desired the product may be admixed with other materials commonly incorporated into fertilizer products such as phosphates, superphosphates, potassium salts, or ammonium salts, or fillers, for example, chalk, gypsum, brick dust and the like.

The process of the present invention may be used to prepare products having a wide range of ratios $$N:P_2O_5:K_2O$$

The desired ratio may be obtained by appropriate selection of proportions of the reactants employed.

The gases containing nitrosyl chloride and chlorine evolved from the reaction of potassium chloride and acids may be treated in any suitable way to recover chlorine. According to a preferred embodiment of the invention the gases are contacted with concentrated sulphuric acid, converting the nitrosyl chloride to nitroso-sulphuric acid and hydrogen chloride. From this treatment the gases comprising chlorine and hydrogen chloride may be readily separated, and the liquid product comprises nitrososulphuric acid and sulphuric acid. This liquid product is suitably treated so as to hydrolyse or decompose the nitrososulphuric acid, for example, by treatment with water or nitric acid. These decomposition reactions may be represented by the following equations:

$$2NOHSO_4 + H_2O \rightarrow N_2O_3 + H_2SO_4$$

$$NOHSO_4 + HNO_3 \rightarrow H_2SO_4 + N_2O_4$$

If desired this decomposition may be carried out in the presence of air or oxygen, which assists in the removal of the oxides of nitrogen. The liquid product comprising a mixture of nitric acid and sulphuric acid can be fed to the first stage of the reaction comprising the reaction of potassium chloride with acid, and the oxides of nitrogen are suitably oxidised to nitric acid, which may be recycled to the system, either to the first stage and/or to the decomposition of nitrososulphuric acid stage.

According to a preferred embodiment the present invention is for a continuous process for the decomposition of potassium chloride with acids which comprises reacting the potassium chloride with a mixture containing nitric acid and sulphuric acid, contacting the evolved gases containing chlorine and nitrosyl chloride with concentrated sulphuric acid, separating therefrom the gaseous products comprising chlorine and hydrogen chloride, and treating the liquid product comprising sulphuric acid and nitrososulphuric acid to decompose the nitrososulphuric acid, and recycling the liquid product comprising nitric acid and sulphuric acid, and the gaseous product comprising oxides of nitrogen, to the system. The oxides of nitrogen are suitably oxidised to nitric acid before recycle.

According to a further preferred embodiment the present invention is for a continuous process for the production of chlorine and fertilizers which comprises reacting potassium chloride with a mixture containing nitric acid and sulphuric acid, contacting the evolved gases containing chlorine and nitrosyl chloride with concentrated sulphuric acid, separating therefrom the gaseous product comprising chlorine and hydrogen chloride, and treating the liquid product comprising sulphuric acid and nitrososulphuric acid with water or aqueous nitric acid to hydrolyse or decompose the nitrososulphuric acid, obtaining a liquid product containing nitric acid and sulphuric acid, and a gaseous product containing oxides of nitrogen, recycling this liquid product to the reaction of acids with potassium chloride, oxidising the said oxides of nitrogen to nitric acid and recycling the formed nitric acid to some part of the system, the liquid product from the reaction of acids with potassium chloride containing sulphuric acid and/or nitric acid and potassium hydrogen sulphate and/or potassium nitrate, being removed from the reaction and treated with phosphoric acid and/or phosphate rock. The aqueous nitric acid obtained by oxidation of the oxides of nitrogen is suitably recycled to the decomposition of nitrososulphuric acid stage of the process.

If desired the hydrogen chloride may be separated from the chlorine by absorption in water forming hydrochloric acid and chlorine, from which the gaseous chlorine may be removed. The hydrochloric acid, if so desired, may be recycled to the system to the potassium chloride oxidation stage, where the hydrochloric acid is also oxidised to chlorine and nitrosyl chloride.

One embodiment of the invention is illustrated solely by way of example in the accompanying drawing.

The FIGURE is a pictorial flowsheet of a continuous process for the oxidation of potassium chloride to produce chlorine and fertilizers.

Potassium chloride is reacted with a mixture of nitric and sulphuric acids in the reactors 1, 2 and 3, arranged in series. Each of these reactors is continuously stirred and has a nominal holding time of five minutes. The temperature in each reactor is maintained at 120° C. The gases evolving from the three reactors, comprising chlorine and nitrosyl chloride, are collected together and led to the tower 8. The liquid product from the third reactor, probably comprising a mixture of nitric and sulphuric acids and potassium bisulphate and/or potassium nitrate is passed to the second stage reactors 4 and 5 arranged in series, where it is reacted with phosphate rock. This reaction is carried out at 70° C. in continuously stirred reactors. If necessary, water is added to these reactors 4 and 5 to keep the reaction mixture fluid. The overflow from the final reactor 5 is passed to a filtration unit 6, which filters off the calcium sulphate. The filtrate product, comprising phosphoric acid, nitric acid and nitrates, etc. is passed to the ammoniation zone 7, where it is neutralised to pH 4.5 under vigorous agitation with ammonia, producing a slurry which is subsequently granulated.

The gases comprising chlorine and nitrosyl chloride are treated countercurrent with sulphuric acid in the tower 8. The nitrosyl chloride reacts with the concentrated sulphuric acid to give nitroso-sulphuric acid and hydrogen chloride. The gases from the tower 8 comprising chlorine and hydrogen chloride are passed to the tower 9 where they are contacted with water which absorbs the hydrogen chloride. The gases from this tower comprising chlorine and the liquid product hydrochloric acid. The chlorine is recovered in any suitable way and they hydrochloric acid may, if desired, be cycled to reactor 1.

The liquid product from the tower 8 comprising a mixture of nitroso-sulphuric acid and sulphuric acid is passed to the tower 10 where it is admixed with dilute nitric acid, causing the nitrososulphuric acid to decompose, giving oxides of nitrogen, nitric acid and sulphuric acid. Oxygen or air is suitably passed through this tower 10 to assist in the removal of the oxides of nitrogen. The liquid product from this tower comprising a mixture of nitric acid and sulphuric acid is fed to the reactor 1.

The gaseous products from this tower, comprising oxides of nitrogen, are passed to the tower 11 where they are contacted with oxygen and water, producing dilute nitric acid which is cycled to the tower 10.

The dilute nitric acid added to the tower 10 requires to contain sufficient water to dilute the sulphuric acid at least to 65% concentration, in order to ensure decomposition of the nitrososulphuric acid.

The following examples are given to illustrate the process of the present invention. The parts and percentages quoted are by weight.

*Example 1*

The process of this example was carried out using the reaction system with continuous overflow as illustrated in the accompanying drawing.

The first three reaction vessels 1, 2, and 3 were operated at a temperature of 115° C. and had a holding time of five minutes in each vessel. The reactors 4 and 5 were at 80° C. and each had a holding time of 15 minutes. Into the system were added 53.7 parts of 98% $H_2SO_4$ per hour through the input line to tower 8, 59.3 parts 57% nitric acid per hour through the input line to tower 10, 4.2 parts of oxygen per hour through the input line at the bottom of tower 11, and 40 parts of potassium chloride per hour to vessel 1. The liquid reaction product overflow from reaction vessel 3 comprising an acid mixture consisting of 73.1 parts of $KHSO_4$ per hour and 33.8 parts of $HNO_3$ per hour in solution was passed to the reaction vessel 4 where it was reacted with 36.3 parts per hour of phosphate rock (ex Morocco expressed as $P_2O_5$, 3.5 CaO). The overflow from vessel 4 passed to vessel 5 and the overflow product from reaction vessel 5 was passed to the belt filtration unit 6 where 64.7 parts of gypsum were removed per hour. The filtrate was passed to vessel 7 where 9.1 parts of anhydrous ammonia per hour were introduced with vigorous agitation. The resulting product was then granulated and dried giving a fertilizer consisting of 54.2 parts of $KNO_3$, 24.6 parts of mono ammonium phosphate and 21.2 parts of ammonium sulphate per hour.

The reaction gases from reaction vessels 1, 2 and 3 were passed to tower 8 where they were contacted with 98% sulphuric acid. The liquid product from tower 8 comprising sulphuric acid and nitrososulphuric acid was passed to tower 10 where it was contacted with the dilute recycle and fresh nitric acid, decomposing the nitrososulphuric acid to sulphuric acid and oxides of nitrogen. The liquid product from tower 10 comprising mixed nitric acid and sulphuric acid was passed into reaction vessel 1. The gaseous product from tower 10 pas passed to tower 11 where the oxides of nitrogen were oxidised in the presence of water giving dilute nitric acid which was recycled to tower 10.

The gaseous product from tower 8 comprising chlorine and hydrogen chloride was passed to tower 9 where it was contacted with water, extracting the hydrogen chloride as hydrochloric acid. Free chlorine was removed from tower 9 at the rate of 19 parts per hour. The hydrochloric acid from tower 9 was recycled to reactor 1.

*Example 2*

The process of this example was carried out using a continuous reaction system with continuous overflow similar to that illustrated in the accompanying drawing, but wherein reaction vessel 4 and filtration unit 6 were omitted.

The first three reaction vessels 1, 2 and 3 were operated at a temperature of 105° C. and each had a holding time of five minutes. Reaction 5 had a holding time of fifteen minutes and was at a temperature of 90°.

Into the system were added 27.4 parts of 98% $H_2SO_4$ per hour through the input line to tower 8, 51.2 parts of 57% nitric acid per hour through the input line to tower 10, 2.1 parts of oxygen per hour through the input line at the bottom of tower 11 and 20.4 parts of potassium chloride per hour to reaction vessel 1.

The liquid reaction product overflow from reaction vessel 3 comprising an acid mixture consisting of 37.2 parts of $KHSO_4$ per hour and 29.2 parts of $HNO_3$ per hour in solution was passed to reactor 5, into which 25.8 parts of 50% $P_2O_5$ phosphoric acid per hour was also added. The resulting mixture was reacted with vigorous agitation with 15.1 parts of anhydrous ammonia per hour in vessel 7. The resulting product was then granulated and dried giving a fertilizer consisting of 23.9 parts potassium sulphate, 18.1 parts of ammonium sulphate, 209 parts of mono ammonium phosphate and 37.1 parts of ammonium nitrate per hour. The gas treatment system was operated as described in Example 1, and free chlorine was removed from tower 9 at a rate of 9.7 parts per hour.

*Example 3*

The process of this example was carried out using the reaction system with continuous overflow as illustrated in the accompanying drawing.

The first three reaction vessels 1, 2 and 3 were operated at a temperature of 120° C. and each vessel possessed a holding time of five minutes. The reactors 4 and 5 were at 80° C. and these had a holding time of fifteen minutes in each reactor.

Into the system were added 38.7 parts per hour of 98% $H_2SO_4$ through the input line to tower 8, 63.4 parts per hour of 65% nitric acid through the input line to tower 10, 3.0 parts per hour of oxygen through the input line at the bottom of tower 11 and 29.2 parts per hour of potassium chloride to vessel 1. The liquid reaction product overflow from reaction vessel 3 comprising an acid mixture consisting of 53.4 parts per hour of $KHSO_4$, 7.3 parts per hour of $H_2SO_4$ and 41.2 parts per hour of nitric acid, all in solution, was passed to reactor 4 where 30.7 parts per hour of phosphate rock (ex Florida expressed as $P_2O_5$, 3.5 CaO) and 10.7 parts per hour of 50% $P_2O_5$ phosphoric acid were added. At the filtration stage 6, 54.8 parts per hour of gypsum ($CaSO_4 2H_2O$) were removed from the system, and the filtrate neutralised with vigorous agitation in vessel 7 by the addition of 10.6 parts per hour of anhydrous ammonia. The resulting product was granulated and dried giving a fertilizer consisting of 39.6 parts potassium nitrate, 9.8 parts of ammonium sulphate, 29.6 parts of mono ammonium phosphate and 21.0 parts of ammonium nitrate per hour.

The gas comprising nitrosyl chloride and chlorine from the reaction vessels 1, 2 and 3 was subjected to treatment in towers 8, 9, 10 and 11 as described in Example 1. Free chlorine was removed from tower 9 at a rate of 13.9 parts per hour.

We claim:
1. In a continuous process for the decomposition of potassium chloride with acids, which process comprises removing the evolved gases containing chlorine and nitrosyl chloride, removing the liquid product of the acid decomposition of potassium chloride from the reaction, treating the same with a phosphoric compound, and recycling nitrogen oxides to the first stage of the process, the improvement comprising reacting the potassium chloride with a mixture consisting essentially of nitric acid of a concentration of from about 40 to 95% by weight and sulphuric acid of a concentration of from about 70 to 98% by weight, said nitric and sulphuric acids being present in amounts exceeding the amounts thereof stoichiometrically required for reaction with potassium chloride by at least 10%, at a temperature in the range of about 80 to 120° C.;

reacting the resulting evolved gases containing chlorine and nitrosyl chloride with concentrated sulphuric acid;

separating the resulting gaseous products comprising chlorine and hydrogen chloride, and the resulting liquid product comprising sulphuric acid and nitrososulphuric acid from each other;

adding to the latter product a member selected from the group consisting of nitric acid and water, thereby decomposing the nitrososulphuric acid therein to sulphuric acid and an oxide of nitrogen;

and introducing the resulting liquid product containing sulphuric acid and nitric acid into the above reaction with potassium chloride.

2. In a continuous process for the decomposition of potassium chloride with acids, which process comprises removing the evolved gases containing chlorine and nitrosyl chloride, removing the liquid product of the acid decomposition of potassium chloride from the reaction, treating the same with a phosphoric compound, and recycling nitrogen oxides to the first stage of the process, the improvement comprising reacting the potassium chloride with a mixture consisting essentially of nitric acid of a concentration of from about 40 to 95% by weight and sulphuric acid of a concentration of from about 70 to 98% by weight, said nitric and sulphuric acids being present in amounts exceeding the amounts thereof stoichiometrically required for reaction with potassium chloride by at least 10%, at a temperature in the range of about 80 to 120° C.;

removing the resulting liquid product containing potassium nitrate and potassium hydrogen sulphate, from the reaction and adding thereto a phosphoric compound selected from the group consisting of phosphoric acid and phosphate rock in an amount such that the total phosphorus added in from 15% to 200% by weight of the potassium chloride used in the first stage;

reacting the resulting evolved gases containing chlorine and nitrosyl chloride with concentrated sulphuric acid;

separating the resulting gaseous products comprising chlorine and hydrogen chloride, and the resulting liquid product comprising sulphuric acid and nitrososulphuric acid from each other;

adding to the latter product a member selected from the group consisting of nitric acid and water, thereby decomposing the nitrososulphuric acid therein to sulphuric acid and an oxide of nitrogen;

and introducing the resulting liquid product containing sulphuric acid and nitric acid into the above reaction with potassium chloride.

3. In a continuous process for the decomposition of potassium chloride with acids, which process comprises removing the evolved gases containing chlorine and nitrosyl chloride, removing the liquid product of the acid decomposition of potassium chloride from the reaction, treating the same with a phosphoric compound, and recycling nitrogen oxides to the first stage of the process, the improvement comprising reacting the potassium chloride with a mixture consisting essentially of nitric acid of a concentration of from about 40 to 95% by weight and sulphuric acid of a concentration of from about 70 to 95% by weight, said nitric and sulphuric acids being present in amounts exceeding the amounts thereof stoichiometrically required for reaction with potassium chloride by at least 10%, at a temperature in the range of about 80 to 120° C.;

removing the resulting liquid product from the reaction and adding thereto phosphate rock, removing the resulting calcium sulphate precipitate, and neutralizing the remaining liquid product;

reacting the resulting evolved gases containing chlorine and nitrosyl chloride with concentrated sulphuric acid;

separating the resulting gaseous products comprising chlorine and hydrogen chloride, and the resulting liquid product comprising sulphuric acid and nitrososulphuric acid from each other;

adding to the latter product a member selected from the group consisting of nitric acid and water, there by decomposing the nitrososulphuric acid therein to sulphuric acid and an oxide of nitrogen;

and introducing the resulting liquid product containing sulphuric acid and nitric acid into the above reaction with potassium chloride.

4. The improvement as claimed in claim 3, wherein there is added to the liquid product from which calcium sulphate has been removed, a member selected from the group consisting of ammonia, potassium hydroxide and potassium carbonate, in such amounts as to neutralize said liquid product.

References Cited in the file of this patent

UNITED STATES PATENTS

| | | |
|---|---|---|
| 2,115,857 | Kaselitz | May 3, 1938 |
| 2,614,040 | Kaikinger | Oct. 14, 1952 |
| 2,954,286 | Bradley et al. | Sept. 27, 1960 |

FOREIGN PATENTS

| | | |
|---|---|---|
| 786,740 | Great Britain | Nov. 27, 1957 |
| 689,351 | France | Sept. 5, 1930 |

OTHER REFERENCES

Mellor: "A Comprehensive Treatise on Inorganic and Theoretical Chemistry," vol. X, page 434, lines 12–14 from bottom of page. Longmans, Green and Co., London, New York, Toronto, 1930.